United States Patent [19]
Xu et al.

[11] Patent Number: 5,404,323
[45] Date of Patent: Apr. 4, 1995

[54] PIPELINED MULTIPLIER FOR SIGNED MULTIPLICATION

[75] Inventors: Jiasheng Xu; Yueming Wang, both of Beijing, China

[73] Assignee: United Microelectronics Corp., Hsin-Chu, Taiwan, Prov. of China

[21] Appl. No.: 149,846

[22] Filed: Nov. 9, 1993

[51] Int. Cl.6 .............................................. G06F 7/52
[52] U.S. Cl. ................................................. 364/757
[58] Field of Search .................... 364/757, 758, 754

[56] References Cited

U.S. PATENT DOCUMENTS

| | | | |
|---|---|---|---|
| 3,866,030 | 2/1975 | Baugh et al. | 364/757 |
| 4,736,335 | 4/1988 | Barkan | 364/758 |
| 5,181,184 | 1/1993 | Shim et al. | 364/758 |

OTHER PUBLICATIONS

Hatamian et al, "A 70-MHz 8-bit×8-bit Parallel Pipelined Multiplier in 2.5 μm CMOS" IEEE Journal of Solid-State Circuits, vol. SC-21, No. 4 pp. 505-513 Aug. 1986.

*Primary Examiner*—Tan V. Mai
*Attorney, Agent, or Firm*—Ladas & Parry

[57] ABSTRACT

A pipelined multiplier for signed multiplication has a plurality of pipeline stages, each of which includes a row of registers, and a row of operating cells. The operating cells includes a plurality: of AND gates, NAND gates, half adders, and full adders connected to perform the signed multiplication according to the Hatamian-Cash algorithm. The pipelined multiplier is characterized by that the most significant bit of the product is directly obtained from the previous less significant bit of the product.

2 Claims, 4 Drawing Sheets

FIG. 2 (PRIOR ART)

$$
\begin{array}{ccccccccc}
& & & & & & & & \overline{X_0Y_7} & X_0Y_6 & X_0Y_5 & X_0Y_4 & X_0Y_3 & X_0Y_2 & X_0Y_1 & X_0Y_0 \\
& & & & & & & \overline{X_1Y_7} & X_1Y_6 & X_2Y_5 & X_2Y_4 & X_1Y_3 & X_1Y_2 & X_1Y_1 & X_2Y_0 \\
& & & & & & \overline{X_2Y_7} & X_2Y_6 & X_3Y_5 & X_3Y_4 & X_2Y_3 & X_2Y_2 & X_2Y_1 & X_3Y_0 \\
& & & & & \overline{X_3Y_7} & X_3Y_6 & X_4Y_5 & X_4Y_4 & X_3Y_3 & X_3Y_2 & X_4Y_1 & X_4Y_0 \\
& & & & \overline{X_4Y_7} & X_4Y_6 & X_5Y_5 & X_5Y_4 & X_4Y_3 & X_4Y_2 & X_5Y_1 & X_5Y_0 \\
& & & \overline{X_5Y_7} & X_5Y_6 & X_6Y_5 & X_6Y_4 & X_6Y_3 & X_6Y_2 & X_6Y_1 & X_6Y_0 \\
& & \overline{X_6Y_7} & X_6Y_6 & \overline{X_7Y_5} & \overline{X_7Y_4} & \overline{X_7Y_3} & \overline{X_7Y_2} & \overline{X_7Y_1} & \overline{X_7Y_0} \\
1 & X_7Y_7 & & & & & & & & & & & & & & 1
\end{array}
$$

FIG. 3 (PRIOR ART)

$$\begin{array}{ccccc}
& & & \overline{X_0Y_3} & X_0Y_2 & X_0Y_1 & X_0Y_0 \\
& & \overline{X_1Y_3} & X_1Y_2 & X_2Y_1 & X_2Y_0 \\
& \overline{X_2Y_3} & X_2Y_2 & \overline{X_3Y_1} & \overline{X_3Y_0} \\
1 & X_3Y_3 & \overline{X_3Y_2} & & & & \\
1 & & & & & &
\end{array}$$

FIG. 4

PIPELINED MULTIPLIER FOR SIGNED MULTIPLICATION

BACKGROUND OF THE INVENTION

The present invention relates to a pipelined multiplier, and more particularly to a pipelined multiplier for signed multiplication or two's complement multiplication.

A multiplier is an essential part of any digital signal processing circuits. Since many numerical calculations can be ultimately reduced to multiplication, multiplication speed is a critical design parameter for many digital signal processing chips. Multiplier circuits are thus often used as benchmark circuits for technology demonstration. Many different technologies have been used to fabricate multiplier circuits. For example, a fast 16×16 bit parallel array multiplier with 120-ns multiplication time was demonstrated using a 3 $\mu$m E/D NMOS process technology, in the literature "A Fast 16 Bit NMOS Parallel Multiplier", Claude P. Lerouge et al., *IEEE Journal of Solid-State Circuits*, Vol. SC-19, No. 3, pp. 338-342, June 1984. A 16-bit×16-bit multiplier for 2 two's complement binary numbers with 120-ns multiplication time was demonstrated using a standard n-E/D MOS process technology with 2.7 $\mu$m design rule, in the literature "A High-Speed Multiplier Using a Redundant Binary Adder Tree", Yoshihisa Harata et al., *IEEE Journal of Solid-State Circuits*, Vol. SC-22, No. 1, pp. 28-34, February 1987. A 3.8-ns 257-mW CMOS 16×16-bit multiplier was described in the literature "A 3.8-ns CMOS 16×16-b Multiplier Using Complementary Pass-Transistor Logic", Kazuo Yano et al., *IEEE Journal of Solid-State Circuits*, Vol. 25, No. 2, pp. 388-395, April 1990. A 54×54-bit multiplier with 10-ns multiplication time was fabricated using double-metal 0.5-$\mu$m CMOS technology, in the literature "A 10-ns 54×54-b Parallel Structured Full Array Multiplier with 0.5-$\mu$m CMOS Technology", Junji Mori et al., *IEEE Journal of Solid-State Circuits*, Vol. 26, No. 4, pp. 600-605, April 1991. An 8-bit×8-bit parallel pipelined multiplier with 70-MHz multiplication rate was fabricated using 2.5-$\mu$m CMOS technology, in the literature "A 70-MHz 8-bit×8-bit Parallel Pipelined Multiplier in 2.5-$\mu$m CMOS", Mehdi Hatamian and Glenn L. Cash, *IEEE Journal of Solid-State Circuits*, Vol. SC-21, No. 4, pp. 505-513, August 1986.

Recently, versatile microprocessor chips also have begun to contain multipliers, which is made possible by the rapid progress in integration technology. Therefore, the demand for improved multiplier performance is increasing.

SUMMARY OF THE INVENTION

Therefore, the primary object of the present invention is to provide a pipelined multiplier for signed multiplication which can decrease one pipeline stage and thus one pipeline stage delay.

In accordance with the present invention, a pipelined multiplier for a signed multiplication of two n-bit two's complement numbers X and Y, comprises a plurality of pipeline stages, each pipeline stage including a row of registers, and a row of operating cells. The operating cells includes a plurality of AND gates, NAND gates, half adders, and adders connected to perform the signed multiplication according to the following equation and to generate a product at the last pipeline stage:

$$XY = \sum_{i=0}^{n-2} \sum_{j=0}^{n-2} x_i y_j 2^{i+j} + 2^{2n-2} x_{n-1} y_{n-1} +$$

$$2^{n-1} \left[ \sum_{i=0}^{n-2} (\overline{x_{n-1} y_i} + \overline{y_{n-1} x_i}) 2^i \right] - 2^{2n-1} + 2^n$$

The pipelined multiplier is characterized by that the most significant bit of the product is directly obtained from the previous less significant bit of the product.

According to one aspect of the present invention, one of the operating cells corresponding to the n-th bit of the product and positioned at the lowermost pipeline position is a full adder with an additional "1" input.

BRIEF DESCRIPTION OF THE DRAWINGS

The present invention can be more fully understood by reference to the following description and accompanying drawings, which form an integral part of this application:

FIG. 2 illustrates the partial product terms for the Baugh-Wooley two's complement multiplication algorithm;

FIG. 3 illustrates the partial product terms for the Hatamian-Cash two's complement multiplication algorithm: and FIG. 4 illustrates the partial product terms of two 4-bit two's complement numbers according to the Hatamian-Cash algorithm.

DETAILED DESCRIPTION OF THE PREFERRED EMBODIMENTS

Figure 1:
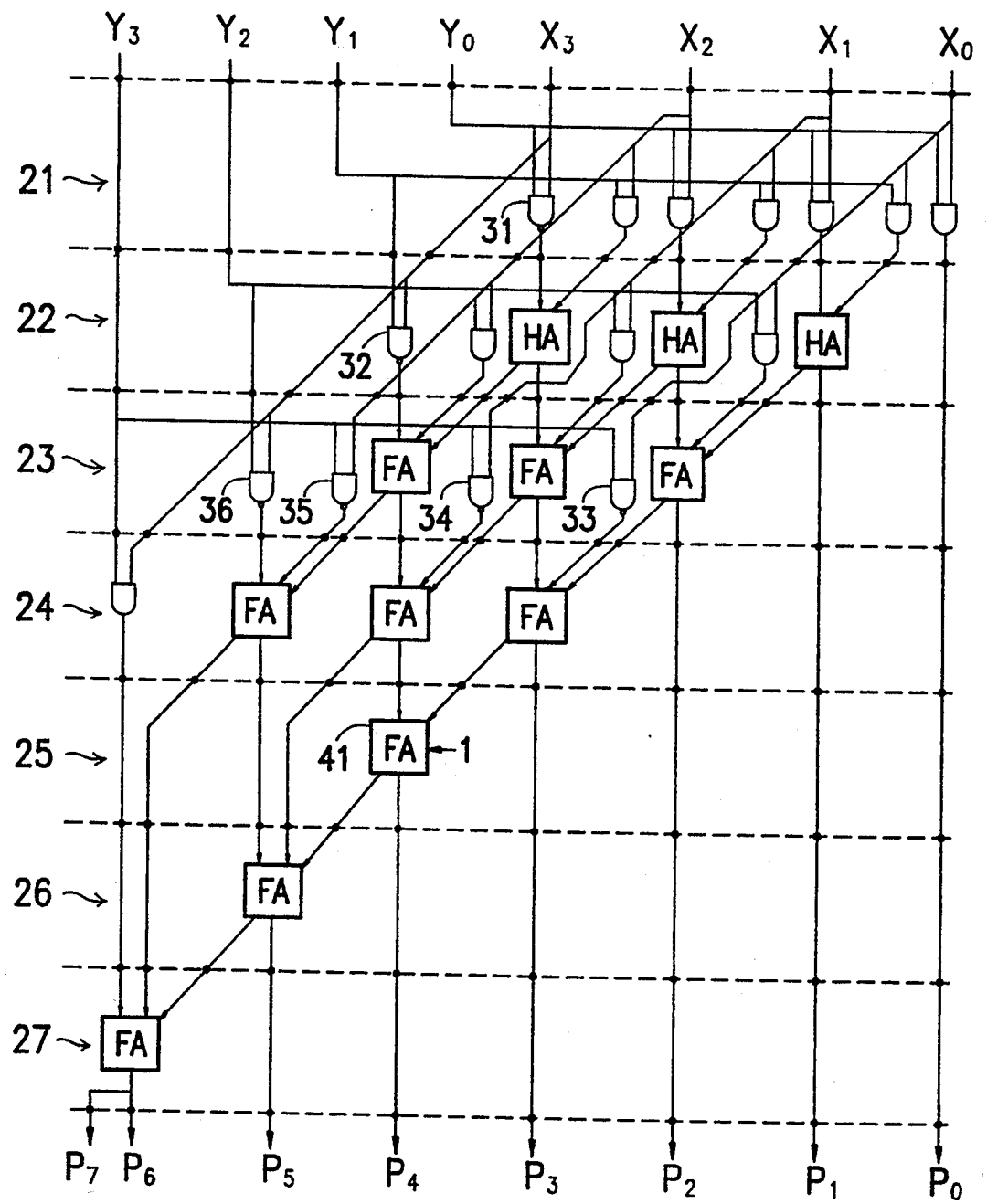
FIG. 1 is a block diagram of a 4-bit×4-bit pipelined multiplier for signed multiplication according to one preferred embodiment of the present invention.

The pipelined multiplier for signed multiplication according to the present invention mainly utilizes the Hatamian-Cash two's complement multiplication algorithm, but simplifies the pipelined multiplier structure to increase its operation speed. Hatamian-Cash two's complement multiplication algorithm is described in the literature "A 70-MHz 8-bit×8-bit Parallel Pipelined Multiplier in 2.5-$\mu$m CMOS" mentioned above, and is a modified form from the Baugh-Wooley algorithm introduced in the literature "A two's complement parallel array multiplication algorithm", C. R. Baugh and B. A. Wooley, *IEEE Trans. Computers*, Vol. C-22, No. 12, pp. 1045-1047, December 1973. For best understanding of the present invention, the Baugh-Wooley algorithm and the Hatamian-Cash algorithm are first described as follows.

In the Baugh-Wooley algorithm, two n-bit two's complement numbers X and Y are represented as:

$$X = -2^{n-1} x_{n-1} + \sum_{i=0}^{n-2} 2^i x_i, \text{ and}$$

$$Y = -2^{n-1} y_{n-1} + \sum_{j=0}^{n-2} 2^j y_j, \text{ and}$$

their product is represented as:

$$XY = \left(-2^{n-1}x_{n-1} + \sum_{i=0}^{n-2} 2^i x_i\right)\left(-2^{n-1}y_{n-1} + \sum_{j=0}^{n-2} 2^j y_j\right) \quad (1)$$

$$= \sum_{i=0}^{n-2}\sum_{j=0}^{n-2} x_i y_j 2^{i+j} + 2^{2n-2}x_{n-1}y_{n-1} -$$

$$2^{n-1}x_{n-1}\sum_{j=0}^{n-2} 2^j y_j - 2^{n-1}y_{n-1}\sum_{i=0}^{n-2} 2^i x_i$$

Figure 2:
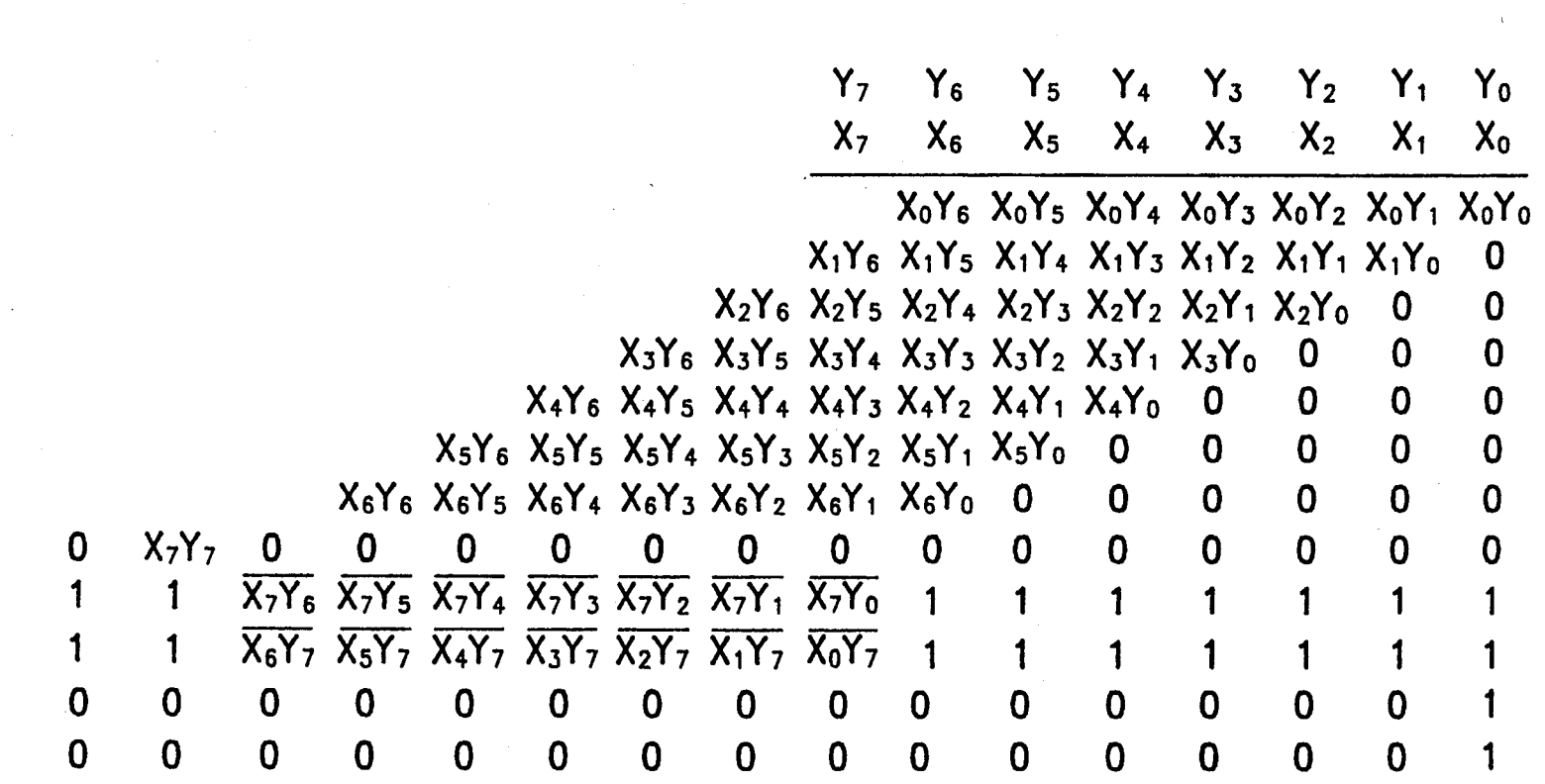

All the partial product terms to generate the above product for two (for example 8-bit) two's complement numbers are explicitly shown in FIG. 2. The first seven rows of this figure correspond to the first term of the above equation. The eighth row corresponds to the second term. The ninth and eleventh rows correspond to the third term expressed in two's complement form. Similarly, the tenth and twelfth rows correspond to the last term of the equation. A simple reorganization of FIG. 2 is done by the Hatamian-Cash algorithm, and results in the array of partial product terms shown in FIG. 3, which is slightly different than the form introduced by Baugh and Wooley. This arrangement is the same as the structure for multiplying two positive integers except for the inverted terms and two 1's added. The array of partial product terms shown in FIG. 3 can also be represented by a mathematical equation derived from the above equation. (1). The third and fourth terms of equation (1) are minus terms, and can be changed into two's complement numbers as follows.

The term of $$-2^{n-1}x_{n-1}\sum_{j=0}^{n-2} 2^j y_j$$

can be changed into $$+2^{n-1}\left(-2^{n-1} + \sum_{j=0}^{n-2} \overline{x_{n-1}y_j}2^j + 1\right),$$

and the term of $$-2^{n-1}y_{n-1}\sum_{i=0}^{n-2} 2^i x_i$$

can be changed into $$+2^{n-1}\left(-2^{n-1} + \sum_{i=0}^{n-2} \overline{y_{n-1}x_i}2^i + 1\right).$$

Add these two terms:

$$2^{n-1}\left(-2^{n-1} + \sum_{j=0}^{n-2} \overline{x_{n-1}y_j}2^j + 1\right) +$$

$$2^{n-1}\left(-2^{n-1} + \sum_{i=0}^{n-2} \overline{y_{n-1}x_i}2^i + 1\right) =$$

$$-2^{2n-1} + 2^{n-1}\left[\sum_{i=0}^{n-2}(\overline{x_{n-1}y_i} + \overline{y_{n-1}x_i})2^i\right] + 2^n$$

Finally, the product of X and Y is:

$$XY = \sum_{i=0}^{n-2}\sum_{j=0}^{n-2} x_i y_j 2^{i+j} + 2^{2n-2}x_{n-1}y_{n-1} +$$

$$2^{n-1}\left[\sum_{i=0}^{n-2}(\overline{x_{n-1}y_i} + \overline{y_{n-1}x_i})2^i\right] - 2^{2n-1} + 2^n$$

As described in the Hatamian-Cash literature, the "1" on the last row of FIG. 3 corresponds to the n-th (i.e. eighth) bit of product, and can be accounted for by changing the corresponding half-adder to a full adder. The "1" on the most significant bit of the last row corresponds to the (2n-1)-th (i.e. fifteenth) bit of the product, and can be accounted for by simply providing the inverse of the carry output of the previous full-adder on that row as the most significant (sign) bit of the product. In a pipelined multiplier, providing the inverse of the carry output of the previous full-adder, however, requires one additional pipeline stage. In the present invention, the most significant bit [i.e. the (2n-1)-th bit] of the product in the pipelined multiplier is directly obtained from the previous less significant bit [i.e. the (2n-2)-th bit] without providing the inverse of the carry output of the previous full-adder. The reason is that the resultant product of two signed numbers has two identical sign bits. Thus, the most significant bit can be treated as the extension of the previous less significant bit. In this way, the "1" on the most significant bit of the last row as shown in FIG. 3 is not used in the present invention. Therefore, the pipelined multiplier structure for signed multiplication of the present invention decreases one register row and one pipeline stage delay.

Referring now to FIG. 1, there is shown a 4-bit×4-bit pipelined multiplier for signed multiplication according to one preferred embodiment of the present invention. The array of partial product terms for two 4-bit two's complement numbers X and Y is shown in FIG. 4, according to the Hatamian-Cash algorithm. The pipelined multiplier of FIG. 1 includes seven pipeline stages 21 through 27. Each pipeline stage includes a row of registers, and a row of operating cells. Each register is denoted by a black point in the figure. The operating cells include ten AND gates, six NAND gates, three half adders (HA), and nine full adders (FA). All partial product terms shown in FIG. 4 are generated by the ten AND and six NAND gates, respectively positioned in the first through fourth pipeline stages 21 through 24. The summations of partial product terms are executed by the three half adders and nine full adders, respectively positioned in the second through seventh pipeline stages 22 through 27. The pipelined structure of FIG. 1 is quite similar to the pipelined multiplier for two positive integers, and is clear to those skilled in the art. Thus, its operations are not described further. However, it should be noted that there are three different features in the pipelined multiplier of FIG. 1. First, six AND gates in the pipelined multiplier for two positive integers are changed into six NAND gates 31 through 36 in the present invention, as shown in FIG. 1. Second, the lowermost half adder corresponding to the bit $P_4$, i.e. the n-th bit, of the product in the pipelined multiplier for two positive integers is changed into a full adder 41 with an additional "1" input in the present invention, as shown in FIG. 1. Third, the most significant bit of product, i.e. the bit $P_7$, in the pipelined multiplier for two two's complement numbers according to the present invention is directly obtained from the previous less significant bit of product, i.e. the bit $P_6$. In this way, one pipeline stage for providing the inverse of the carry output of the previous full-adder cell as described in the Hatamian-Cash literature is omitted, and the operation speed is thus increased.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A pipelined multiplier for a signed multiplication of two n-bit two's complement numbers X and Y, comprising a plurality of pipeline stages, each pipeline stage including a row of registers, and a row of operating cells, said operating cells including a plurality of AND gates, NAND gates, half adders, and full adders connected to perform said signed multiplication according to the following equation and to generate a product at the last pipeline stage:

$$XY = \sum_{i=0}^{n-2} \sum_{j=0}^{n-2} x_i y_j 2^{i+j} + 2^{2n-2} x_{n-1} y_{n-1} +$$

$$2^{n-1} \left[ \sum_{i=0}^{n-2} (\overline{x_{n-1} y_i} + \overline{y_{n-1} x_i}) 2^i \right] - 2^{2n-1} + 2^n$$

said pipelined multiplier being characterized by that the most significant bit of said product is directly obtained from the previous less significant bit of said product.

2. A pipelined multiplier as claimed in claim 1, wherein one of said operating cells corresponding to the n-th bit of said product and positioned at the lowermost pipeline position is a full adder with an additional "1" input.

* * * * *